United States Patent [19]

Paul, Jr.

[11] 4,444,214
[45] Apr. 24, 1984

[54] REPLACEABLE RUPTURE DISC CARTRIDGE ARRANGEMENT

[75] Inventor: Herman L. Paul, Jr., Lebanon, Pa.

[73] Assignee: Continental Disc Corporation, Kansas City, Mo.

[21] Appl. No.: 264,276

[22] Filed: May 18, 1981

[51] Int. Cl.³ .............................................. F16K 13/04
[52] U.S. Cl. .................................. 137/68 R; 137/315; 137/454.2; 137/515.7
[58] Field of Search ............... 137/68 R, 454.2, 454.6, 137/515.7, 12, 119, 557, 625.13, 625.15, 625.16, 876, 887, 625.47, 613, 625.12

[56] References Cited

U.S. PATENT DOCUMENTS

| | | | |
|---|---|---|---|
| 3,442,288 | 5/1969 | Scaramucci | 137/454.2 X |
| 3,840,042 | 10/1974 | Brundage | 137/454.2 X |
| 3,934,602 | 1/1976 | Muddiman | 137/68 R |
| 4,072,160 | 2/1978 | Hansen | 137/68 R |
| 4,073,402 | 2/1978 | Wood | 137/68 R X |
| 4,257,528 | 3/1981 | Brodie | 137/68 R |
| 4,270,560 | 6/1981 | Kearney | 137/68 R |
| 4,325,403 | 4/1982 | Uhlmann | 137/454.6 X |

Primary Examiner—Harold W. Weakley
Attorney, Agent, or Firm—Litman, Day & McMahon

[57] ABSTRACT

A self-sealing and self-positioning replaceable rupture disc cartridge arrangement includes a cartridge receptacle mounted in a pressure relief vent having spaced apart opposite end walls with circumferential positioning grooves on respective internal surfaces thereof and a cartridge assembly having a rupture disc mounted therein for removable placement within the cartridge receptacle. The cartridge assembly includes an annular cartridge body having a cylindrical passage therethrough with a shoulder at one end thereof to retain disc seat rings, having the rupture disc placed therebetween, within the cartridge body. The cartridge includes seal mounting rings which have circumferential seals thereon, which are resiliently retractable into circumferential channels at opposite ends of the cartridge body, and which cooperate with the positioning grooves on the cartridge receptacle walls whereby upon placement of the cartridge within the receptacle, the seal rings snap into the positioning grooves. At least one of the seal rings acts as a piston such that when the pressure vessel is pressurized, a surface of the seal ring is exposed to gas pressure to forcefully urge the seal ring against an internal surface of the associated end wall of the receptacle to positively seal therebetween.

22 Claims, 12 Drawing Figures

REPLACEABLE RUPTURE DISC CARTRIDGE ARRANGEMENT

FIELD OF THE INVENTION

The present invention relates to easily replaceable rupture disc arrangements and, more particularly, to such an arrangement including a cartridge receptacle positioned in a pressure relief vent and a cartridge assembly removably received in the receptacle and having a rupture disc mounted therein.

BACKGROUND OF THE INVENTION

Rupture discs provide a relatively inexpensive means for protecting pressure systems from overpressure, especially when compared to pressure relief valves of the same accuracy in tripping at a selected overpressure. However, once a rupture disc has ruptured, it must be replaced before the pressure vessel can be pressurized again. In most installations, this involves the time consuming removal of pipe flanges, removal and replacement of the spent rupture disc assembly, replacement of the pipe flanges, and tightening of nuts and bolts thereof to specified torque. In order to expedite the replacement of rupture discs, preassembled rupture disc arrangements have been provided in which the rupture disc is sandwiched between a pair of seating or sealing rings which are bolted or welded together either by the manufacturer or in the maintainence shop of the plant in which the disc is employed. However, with most such disc assemblies, it is still necessary to remove and replace the pipe flanges between which the assembly is installed. Such disassembly and reassembly of the pressure relief vent requires that man hours be expended; and, more importantly, the pressure vessel remains inoperative during such repair.

SUMMARY OF THE INVENTION

The replaceable rupture disc cartridge arrangement of the present invention overcomes the aforementioned disadvantages of prefabricated rupture disc assemblies of prior arrangements by providing a cartridge receptacle attached to and communicating with the pressure relief vent of the pressure vessel and a rupture disc cartridge having the rupture disc mounted therein for manual insertion and withdrawal from the cartridge receptacle.

OBJECTS OF THE INVENTION

The principal objects of the present invention are: to provide an arrangement for conveniently replacing an expended rupture disc; to provide such an arrangement which may be changed with a minimum of down time of the pressure vessel; to provide such an arrangement including a receptacle portion affixed in the pressure relief vent and a rupture disc cartridge portion received in the receptacle and manually removable therefrom; to provide such an arrangement which includes means to properly position the cartridge within the receptacle; to provide such an arrangement which locks the cartridge within the receptacle during the existance of pressure within the vessel to prevent unauthorized removal of the cartridge and consequent release of pressure; to provide such an arrangement in which additionally the cartridge may be locked in the receptacle externally; to provide such a rupture disc cartridge which is reusable, requiring only replacement of the rupture disc itself; to provide such an arrangement which is self-sealing in response to pressure within the pressure relief vent associated therewith; to provide such an arrangement which protects the seal members thereof from damage during insertion and removal of the cartridge from the receptacle; to provide such an arrangement which is adapted for use in a linear or rotary type of magazine of a plurality of such arrangements; to provide such an arrangement wherein critical adjustments to the cartridge assembly do not have to be made at the installation site of the disc, but may be made in the plant shop and the cartridge stored in a ready condition; to provide such an arrangement in which the cartridge may be easily removed for inspection of the rupture disc; and to provide such a replaceable rupture disc cartridge arrangement which is economical to manufacture, convenient and durable in use, positive in operation, and which is particularly well adapted for its intended purpose.

Other objects and advantages of the present invention will become apparent from the following description taken in connection with the accompanying drawings wherein are set forth, by way of illustration and example, certain embodiments of this invention.

The drawings constitute a part of the specification, include an exemplary embodiment of the present invention, and illustrate various objects and features thereof.

DETAILED DESCRIPTION OF THE PREFERRED EMBODIMENT

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring to the drawings in more detail:

The reference numeral 1 generally designates a removable rupture disc cartridge arrangement according to the present invention. The arrangement 1 includes a cartridge receiving receptacle 2 installed in a pressure relief vent 3 of a pressure vessel (not shown) and a rupture disc cartridge assembly 4 which is removably insertable into the receptacle 2. The cartridge assembly 4 has a rupture disc 5 (see FIG. 3) positioned therein to block the pressure relief vent until such time as pressure within the relief vent 3 exceeds the designed rupture pressure of the disc 5.

Figure 1:
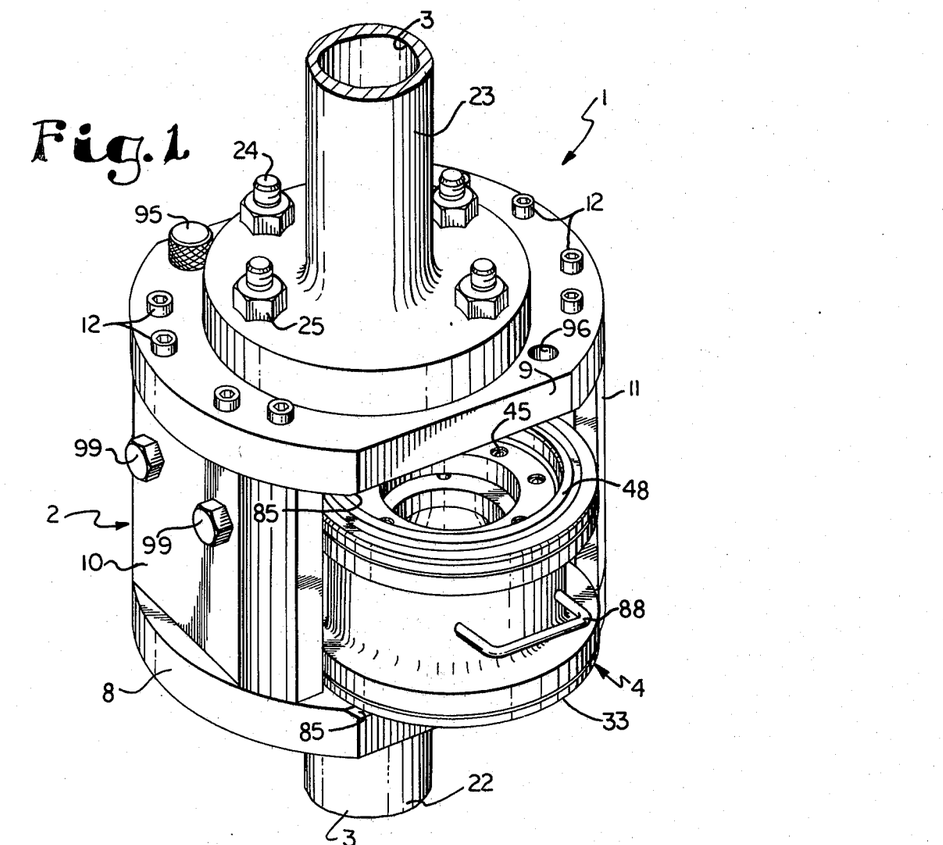
FIG. 1 is a perspective view at a diminished scale of the removable rupture disc cartridge arrangement according to the present invention and shows the cartridge partially removed from the receptacle.
Figure 3:
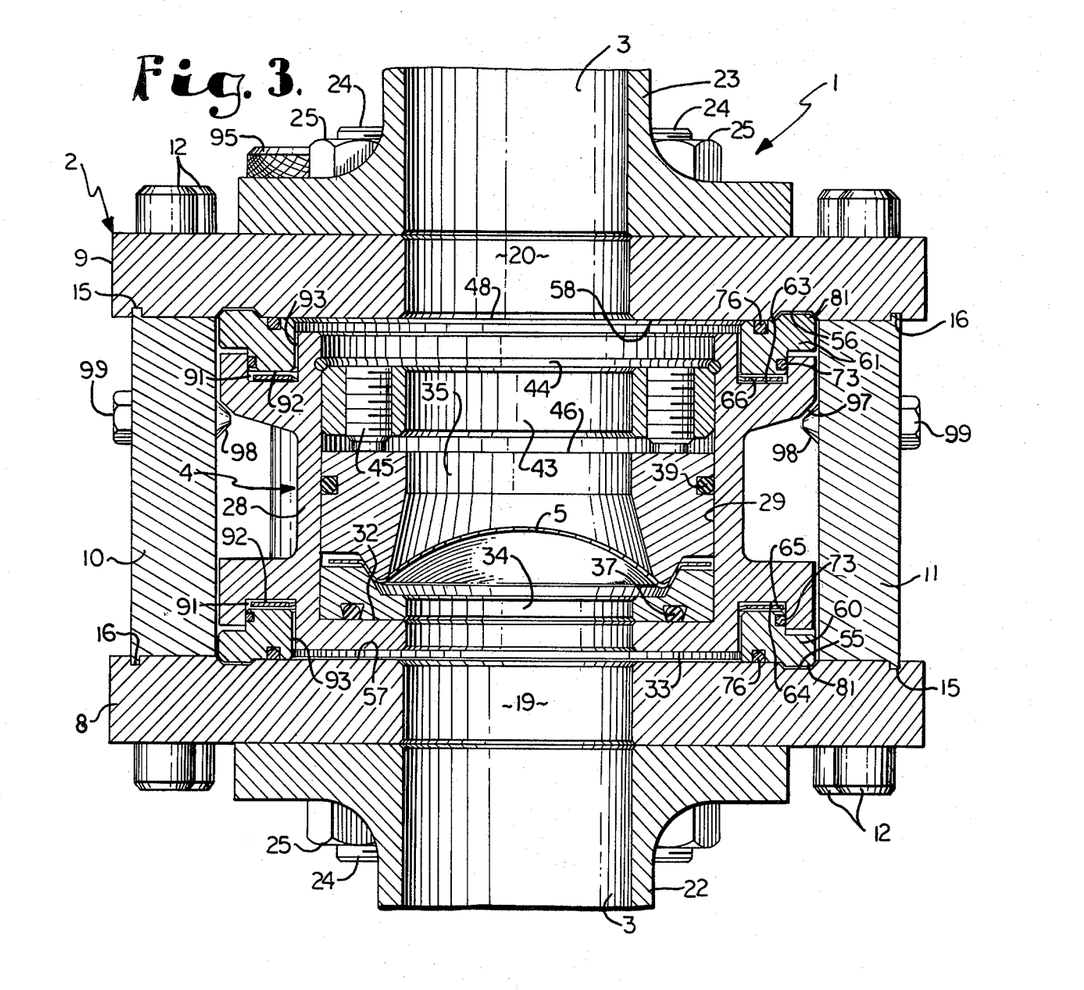
FIG. 3 is a cross-sectional view taken on line 3.—3. of FIG. 6 and illustrates details of the receptacle with the removable disc cartridge installed therein.
Figures 6, 7:
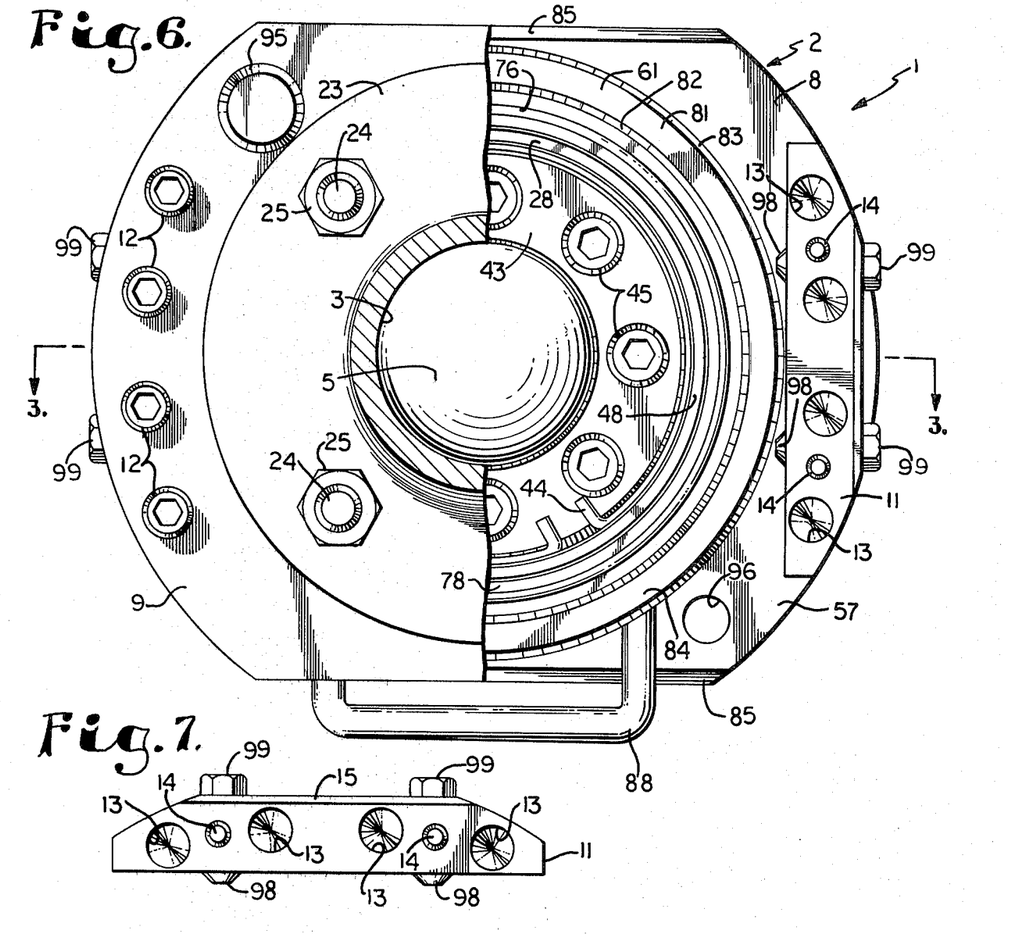
FIG. 6 is a top plan view of the cartridge receptacle with portions of the wall thereof removed to illustrate details of the cartridge received therein.
FIG. 7 is a top plan view of a side wall of the receptacle.
Figure 8:
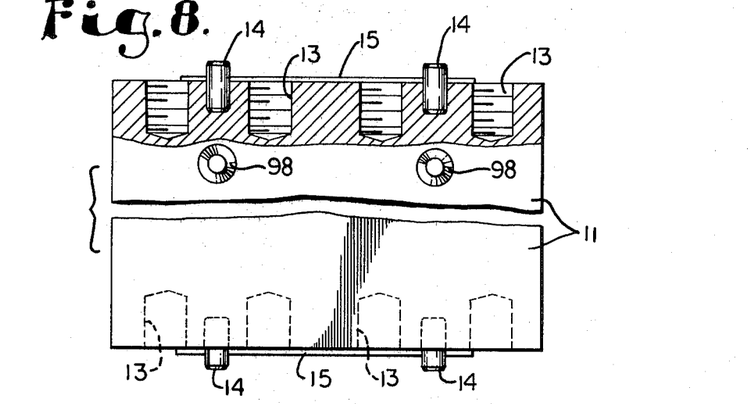
FIG. 8 is a side elevational view of a side wall of the receptacle with a portion broken away to illustrate details of the wall.

Referring particularly to FIGS. 1, 3, and 6, a preferred receptacle 2 is formed by a pair of spaced apart end walls 8 and 9 and a pair of spaced apart side walls 10 and 11 joined together as by Allen screws 12 which pass through apertures in the end walls 8 and 9 and engage tapped bores 13 formed in the side walls 10 and 11. The walls forming the receptacle 2 may include means such as guide pins 14 and/or guide rims 15 to facilitate alignment of the walls during assembly of the receptacle 2. As illustrated in FIGS. 6, 7, and 8, the side walls 10 and 11 include dowel pins 14 which fit into apertures (not shown) in the end walls 8 and 9. The side walls 10 and 11 further include guide rims 15 which engage guide grooves 16 (see FIG. 3) in the end walls 8 and 9. The end walls 8 and 9 include respective pressure relief apertures 19 and 20 formed therethrough. The receptacle 2 is installed in the pressure relief vent 3 with the pressure relief apertures 19 and 20 in communication therewith. As shown in FIG. 3, the pressure relief vent 3 includes an inlet pipe flange 22 joined to the end wall 8 and an outlet pipe flange 23 joined to the end wall 9 by means such as threaded studs 24 and nuts 25.

Figure 2:
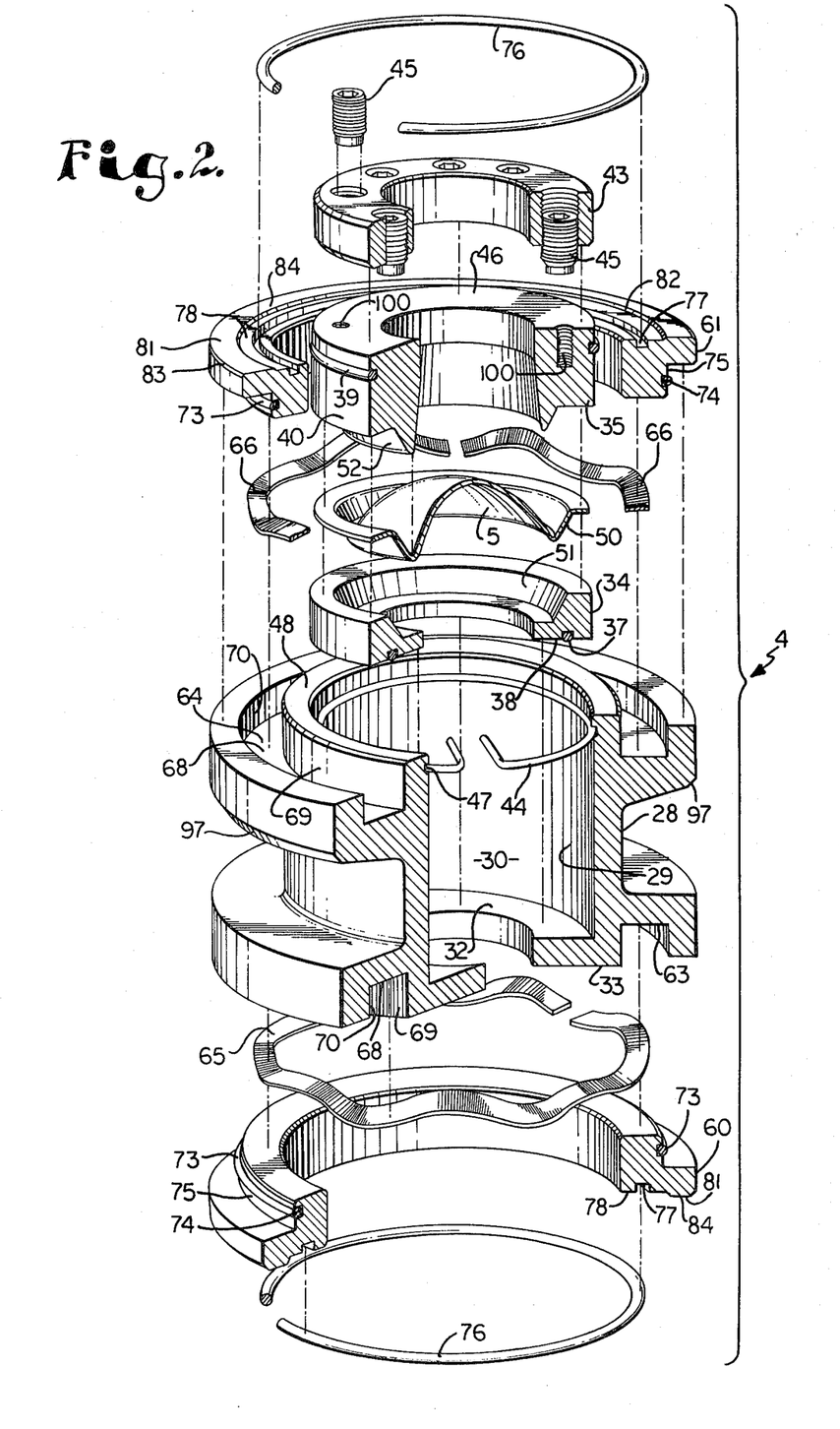
FIG. 2 is an exploded perspective view illustrating components of the removable rupture disc cartridge.

Referring to FIG. 2, the rupture disc cartridge assembly 4 includes an annular rupture disc cartridge body 28 in which the rupture disc 5 is removably mounted. The cartridge body 28 includes an inner cylindrical surface 29 defining a central passage 30 therein. The rupture disc 5 may be mounted in any convenient manner within the passage 30 to block fluid flow therethrough. In the preferred embodiment of the present invention, a shoulder 32 is formed at an inlet end 33 of the passage 30. The rupture disc 5 is mounted between first and second disc seating rings 34 and 35 which are received within the passage 30. The first seating ring 34 preferably includes means such as an O-ring 37 for sealing between a lower abutment surface 38 thereof and the shoulder 32. In a similar manner, the second seating ring 35 includes an O-ring 39 for sealing between an outer cylindrical surface 40 thereof and the cylindrical surface 29 of the cartridge body 28.

The rupture disc 5 and seating rings 34 and 35 are retained within the passage 30 by cooperation of a disc retaining ring 43 and a snap ring 44. The disc retaining ring 43 includes a plurality of circumferentially spaced screws 45 extending therethrough for contact with a contact surface 46 of the second disc seating ring 45. The snap ring 44, or removable shoulder forming means, is received in a snap ring groove 47 formed in the cylindrical surface 29 adjacent an outlet end 48 of the cartridge body 28. The rupture disc 5 is positioned in the passage 30 to seal same by placement of the first seating ring 34 therein against the shoulder 32; placement of the disc 5 with a seating rim 50 thereof in contact with a seating surfac 51 of the seating ring 34; positioning the second seating ring 35 in the passage with a seating surface 52 thereof in contact with the seating rim 50 of the rupture disc 5; placement of the disc retaining ring 43 in the passage; and positioning the snap ring 44 in the snap ring groove 47. By evenly tightening the screws 45 to a specified torque, the seating rings are pressed together to properly seat the rupture disc 5, and the O-ring 37 is pressed against the shoulder 32 whereby the passage 29 is effectively sealed. The precise degree of torque to which the screws 45 are tightened depends in part upon the level of pressure expected within the pressure relief vent 3.

The arrangement 1 includes means to positively position the cartridge assembly 4 within the receptacle 2, to provide effective sealing between the receptacle 2 and cartridge assembly 4, and to provide protection for sealing members during insertion and removal of the cartridge assembly 4 with relation to the receptacle 2. In the preferred embodiment of the arrangement 1, the receptacle end walls 8 and 9 include respective circumferential positioning grooves 55 and 56 on internal surfaces respectively 57 and 58 thereof (see FIG. 3). The grooves 55 and 56 are formed in surrounding relation to the pressure relief apertures respectively 19 and 20. The cartridge assembly 4 includes inlet and outlet seal mounting rings respectively 60 and 61 for cooperation respective with the positioning grooves 55 and 56. The inlet end 33 and an outlet end 48 of the cartridge body 28 have circumferential channels 63 and 64 formed thereon.

Each of the channels 63 and 64 include means to resiliently urge the respective seal ring 60 and 61 therefrom. As illustrated in FIG. 2, the resilient means includes wave springs 65 and 66 positioned in the channels 63 and 64 respectively. Each of the channels includes an end surface 68, an inside surface 69, and an outside surface 70. The arrangement 1 includes sealing means operatively positioned between the cartridge assembly 4 and the receptacle 2 to prevent the escape of fluid therebetween. In the illustrated embodiment, the sealing means includes a cartridge body seal in the form of an O-ring 73 positioned in a circumferential groove 74 formed on an outside surface 75 of the seal ring 60 and 61 for engagement with the outside surfaces 70 of the channels 63 and 64. Each of the seal rings 60 and 61 further include an end seal O-ring 76 positioned in a groove 77 of an end surface 78 thereof for engagement with the associated internal surfaces 57 and 58 of the end walls 8 and 9 of the receptacle 2.

Figure 4:
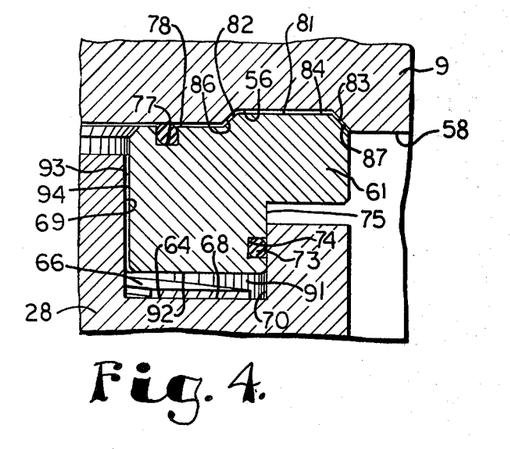
FIG. 4 is an enlarged fragmentary cross-sectional view of one of the seal rings of the cartridge engaging an associated positioning groove in an end wall of the receptacle.
Figure 5:
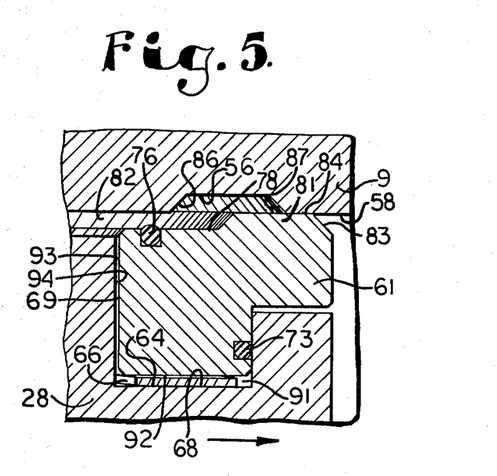
FIG. 5 is a view of the arrangement similar to the FIG. 4 and illustrates retraction of the seal ring from the positioning groove during removal of the cartridge from the receptacle.

The present invention provides cam means to maintain space between the end seal O-rings 76 and the internal surfaces 57 and 58 of the receptacle end walls 8 and 9 respectively during insertion of the cartridge assembly 4 into the receptacle 2 and during removal of the cartridge assembly 4 therefrom in order to prevent damage to the end seals 76 by scraping of same against the internal surfaces 57 and 58. In the preferred arrangement 1, the cam means is embodied as a circumferential cam ridge 81 provided on the seal rings 60 and 61. As shown in FIGS. 4 and 5, each ridge 81 includes an inside circumferential ramp surface 82, an outside circumferential ramp surfaces 83, and a peak surface 84. The peak surface 84 is spaced above the end surface 78 of the respective rings 60 and 61 and above the end seal O-rings 76. In order to facilitate insertion of the cartridge 4 into the receptacle 2, the end wall internal surfaces 57 and 58 are provided with edge bevels 85 (FIG. 6) on external edges thereof.

Upon insertion of the cartridge assembly 4 into the receptacle 2, the outside ramp surface 83 of the seal rings 60 and 61 engage the edge bevels 85 whereby the seal rings are depressed into the cartridge body 28, and the peak surfaces 84 of the seal ring ridges 81 engage the internal surfaces 57 and 58 of receptacle end walls. The cartridge assembly 4 rides on the peak surfaces 84 as the assembly is inserted further into the receptacle 2. As the cartridge assembly 4 reaches a centered position (as in FIG. 6) within the receptacle 2, the ridges 81 of the seal rings 60 and 61 drop into the positioning grooves 55 and 56 by cooperation of the ramp surfaces 82 and 83 of the seal rings respectively with inside circumferential ramp surfaces 86 and outside circumferential ramp surfaces 87 of the grooves 55 and 56. Upon withdrawal of the cartridge assembly 4 from the receptacle 2, the sequence of actions is reversed. Cooperation between the ridges 81 and the grooves 55 and 56 not only protects the end seal 76 from damaging sliding contact with the internal surfaces 57 and 58, but also functions to properly position the cartridge assembly 4 within the receptacle 2. As shown in FIG. 6, the cartridge assembly 4 may include means such as a handle 88 to facilitate insertion and removal of the cartridge assembly 4 relative to the receptacle 2.

In order to positively seal between the cartridge assembly 4 and the receptacle 2, the arrangement 1 communicates pressurized fluid from the pressure relief vent 3 to the seal rings 60 and 61 to forcefully urge same against the respective internal surfaces 57 and 58. An expansion chamber 91 is defined between the end surface 68 of the channels 63 and 64 and a head surface 92 of the seal rings 60 and 61. Pressure is communicated between the pressure relief vent 3 and the expansion chamber 91 by means of passageways 93 defined between the inside surfaces 69 of the channels 63 and 64 and inside surfaces 94 of the seal rings 60 and 61. Upon pressurization of the pressure relief vent 3 when the rupture disc 5 is intact, the expansion chamber 91 at the inlet end 33 of the cartridge body 28 is pressurized thereby urging the inlet seal ring 60 against the internal surface 57 of the receptacle 2. By reaction, the cartridge body 28 is driven in the opposite direction such that the outlet end seal ring 61 is urged, via the spring 66, against the internal surface 58 of the receptacle 2.

The pressurization of the expansion chambers 91 in the preferred arrangement 1 has an additional advantage in that removal of the cartridge assembly 4, which could be disastrous to persons in the vicinity of the arrangement 1 during the existence of high pressure or noxious gases in the pressure relief vent 3, is prevented by the forceful engagement of the ridge 81 with the grooves 55 and 56. The same engagement of such sealing ring ridges with the grooves prevents removal of the cartridge assembly 4 after the rupture disc 5 has ruptured until the pressure in the vent 3 has exhausted sufficiently. The arrangement 1 is also provided with external means to retain the cartridge assembly 4 in the receptacle 2, such as the retaining pins 95 which extend through aligned apertures 96 in the end walls 8 and 9 of the receptacle 2.

The inlet and outlet seal rings 60 and 61 as well as the positioning grooves 55 and 56 are substantially similar for the sake of economy. Therefore, it is necessary that means be provided to prevent the insertion of the cartridge assembly 4 into the receptacle 2 in an inverted orientation. In the arrangement 1, the cartridge body 28 is provided with an indentation or bevel 97 at a position spaced from one of the ends thereof, such as the outlet end 48. The side walls 10 and 11 are provided with projections 98 at positions spaced from the associated end of the receptacle 2, in this case the outlet end, for cooperation with the bevel 97. The projections 98 may be provided as by bolts 99 which extend through the side walls 10 and 11.

In operation, the cartridge assembly 4 is normally assembled in the plant shop and kept in an assembled condition in a location convenient to the receptacle 2. Upon the rupture of the installed disc 5, and after pressure has completely exhausted through the pressure relief vent 3, the pins 95 are removed, the handle 88 is manually grasped, and the spent cartridge assembly 4 is removed. Should great resistance to the removal of the assembly 4 be encountered, it may be assumed that pressure still exists within the vent 3. Upon removal of the spent assembly 4, a fresh assembly 4 with the disc 5 intact therein is inserted into the receptacle 2 until the seal rings 60 and 61 snap into the positioning grooves 55 and 56. The pins 95 may then be replaced to thereby render the arrangement 1 operational. The spent assembly 4 may then be returned to the plant shop for disassembly and replacement of the ruptured disc 5 and reassembly. The disc seating ring 35 may be provided with threaded bores 100 for attachment of a puller thereto to facilitate disassembly of the cartridge assembly 4.

Figure 9:
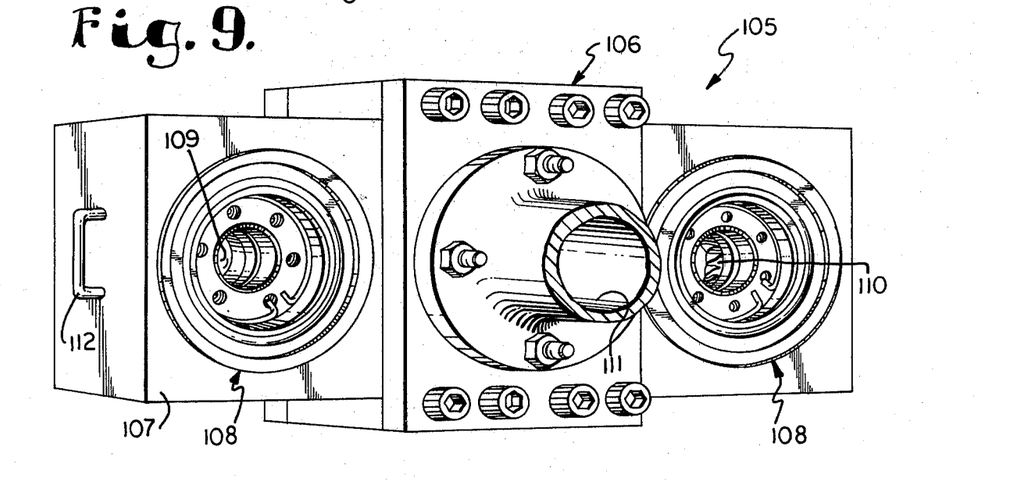
FIG. 9 is a perspective view at a diminished scale of a first modified form of the receptacle of the present invention wherein the receptacle is adapted to receive a magazine providing a plurality of removable rupture disc cartridges according to the present invention.

FIG. 9 illustrates a modified arrangement 105 according to the present invention. The arrangement 105 includes a receptacle 106 adapted to receive a magazine 107 having a plurality of cartridge assemblies 108 positioned therein for rapid replacement of a rupture disc 109. The cartridge assemblies 108 are substantially similar to the cartridge assembly 4 hereinabove. The receptacle 106 is substantially similar to the receptacle 2 and cooperates with the cartridge assemblies 108 in the same manner as does the receptacle 2. The principle difference between the preferred receptacle 2 and the modified receptacle 106 is in provisions to receive the magazine structure 107 therein. Upon the rupture of one of the disc, such as the disc 110, and the exhaustion of pressure through a pressure relief vent 111, a handle 112 is grasped and the magazine 107 is pushed through the receptacle 106 to remove the spent cartridge assembly 108 from the receptacle 106 and to position a fresh cartridge assembly therein. Upon positioning the fresh assembly 108 within the receptacle 106, the spent assembly is exposed and may be removed and replaced with a fresh one so that a plurality of the cartridge assemblies 108 are at all times available for quick replacement in the event of an overpressure within the pressure relief vent 111. Still other configurations of magazines employing pluralities of cooperating rupture disc cartridge assemblies and receptacles according to the present invention, such as rotary-type magazines and automatically actuated magazines, are envisioned; and such type of magazines are considered to fall within the scope of the present invention when the receptacle and cartridge arrangements as described herein are employed therein.

Figures 10, 11, 12:
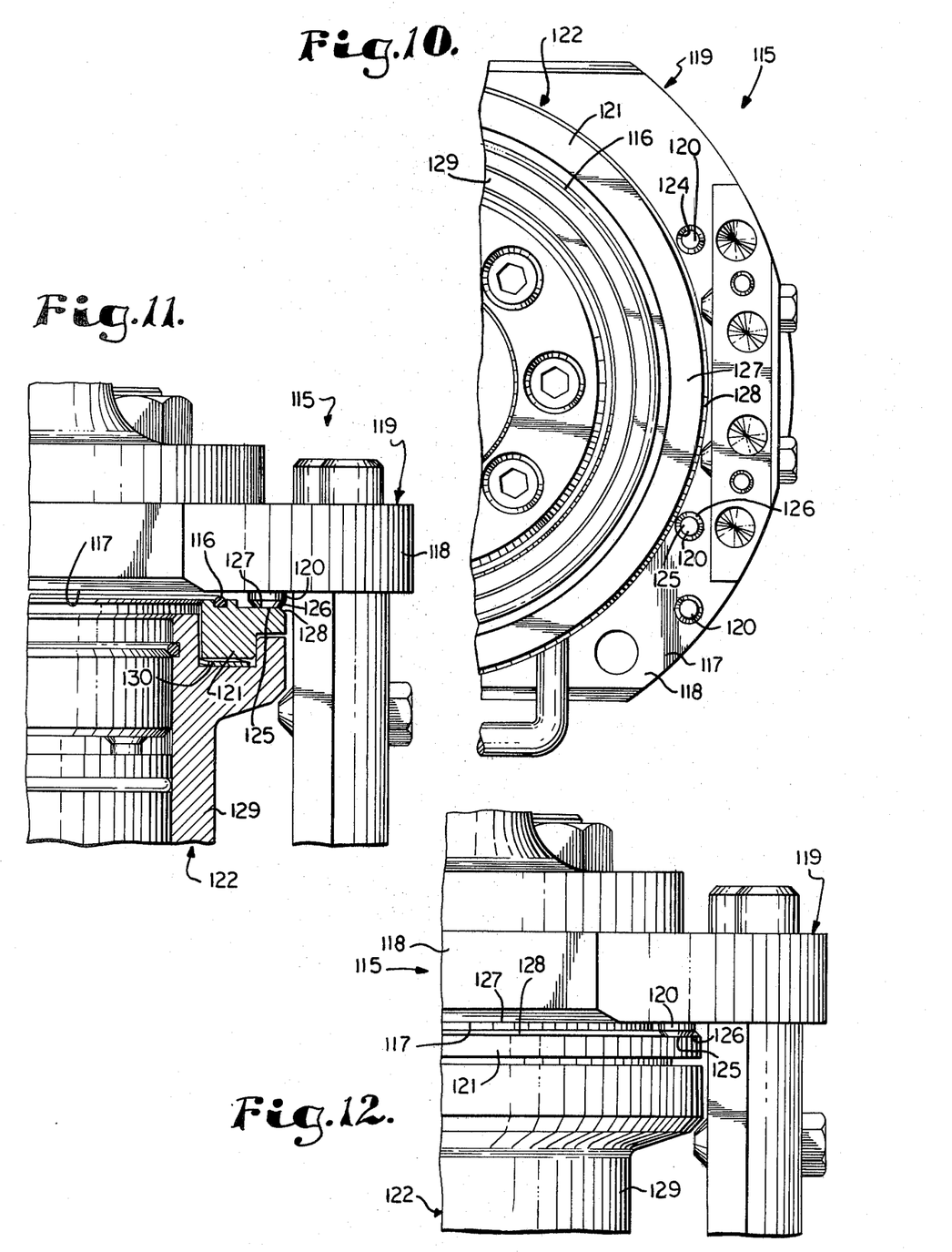
FIG. 10 is a fragmentary top plan view of a second modified arrangement with one end wall removed to illustrate details of a modified seal mounting ring and seal ring cam therefor.
FIG. 11 is a slightly enlarged fragmentary elevational view of the second modified arrangement having a cartridge assembly partially inserted and with portions broken away to show cooperation between the seal ring and the seal ring cam.
FIG. 12 is a view of the second modified arrangement similar to FIG. 11 showing the cartridge assembly properly positioned within a receptacle.

FIGS. 10, 11 and 12 illustrate a second modified embodiment of an arrangement 115 according to the present invention. In the arrangement 115, cam means to prevent damaging contact of end seal O-rings 116 with associated internal surfaces 117 of end walls 118 of a receptacle 119 are embodied as linear cams 120 which are positioned on internal surfaces 117 for engagement with seal mounting rings 121 of an associated cartridge assembly 122. The cams 120 may be of any convenient form such as of an elongated rectangular shape and including ramped surfaces. In the illustrated embodiment, the cams 120 are small cylindrical "buttons" which are pressed into bored out apertures 124 in the internal surfaces 117. Each of the cams 120 includes an end surface 125 and a peripheral bevel 126. Each of the seal rings 121 includes a bearing surface 127 and a circumferential bevel 128.

Upon insertion of the cartridge assembly 122 into the receptacle 119, the bevels 128 of the seal rings 121 engage the bevels 126 of the cams 120 thereby depressing the seal rings 121 into a cartridge body 129 of the assembly 122 and spacing the end seal O-rings 116 from the surfaces 117 of the receptacle 119. The cartridge assembly 122 then rides on the cams 120 with the bearing surfaces 127 of the seal rings 121 engaging the end surfaces 125 of the cams as the cartridge assembly 122 is inserted further. Upon reaching the proper position within the receptacle 119, the seal rings 121 disengage the cams 120, and the end seals 116 engage the internal surfaces 117 in response to wave springs 130 biasing against the seal rings 121. For removal of the cartridge assembly 122 from the receptacle 119, the sequence is reversed. In all other aspects, the arrangement 115 is substantially similar to the arrangement 1.

While certain forms of the present invention have been described and illustrated, it is not to be limited thereto except insofar as such limitations are included in the following claims.

What is claimed and desired to secure by Letters Patent is:

1. A replaceable rupture disc cartridge arrangement comprising:
   (a) a rupture disc cartridge receptacle having end walls and structural means to maintain said end walls in fixed and spaced apart relation, each wall having a pressure relief aperture therethrough, said receptacle being adapted for installation with the pressure relief apertures thereof in communication with a pressure relief vent;
   (b) a rupture disc cartridge body having a central passage therethrough and having opposite ends, said cartridge body being manually and removably inserted in said receptacle with said passage communicating with said pressure relief apertures and while said end walls remain in said spaced apart relation;
   (c) a rupture disc removably retained in said passage and preventing fluid flow therethrough prior to rupture thereof;
   (d) sealing means operatively positioned between said ends of said cartridge body and respective facing internal surfaces of said end walls of said receptacle to prevent the leakage of pressure therebetween;
   (e) a locking mechanism for locking said cartridge body within said receptacle when positive pressure is present in said central passage; said locking mechanism including a locking member received in a first of said receptacle or said cartridge body and being slidable to a first position wherein said locking member does not interfer with placement of said cartridge body into said receptacle; and
   (f) said locking mechanism further including a seat cooperating with said locking member in a second of said cartridge body or said receptacle; said locking member communicating with said central pressure such that fluid pressure biases said locking member into a second position wherein said locking member engages said seat when said cartridge body is in said receptacle and there is positive pressure within said passageway thereby locking said cartridge body within said receptacle.

2. An arrangement as set forth in claim 1 including orientation means preventing the inverted insertion of said cartridge body into said receptacle.

3. An arrangement as set forth in claim 2 wherein said receptacle includes opposite spaced apart side walls and wherein said orientation means includes:
   (a) a circumferential bevel spaced from only one end of said cartridge body; and
   (b) a projection from one of said side walls at a position spaced from the end wall of said receptacle which is associated with said one end of said cartridge body, said projection cooperating with said bevel to permit insertion of said cartridge body into said receptacle only when said cartridge body is properly oriented.

4. An arrangement as set forth in claim 1 wherein:
   (a) said passage includes an internal circumferential shoulder at one end thereof; and including:
   (b) a first disc seating ring having a first seating surface and being positioned in said passage abutting said shoulder;
   (c) said rupture disc having a circumferential rim and being positioned with said rim in contact with said first seating surface;
   (d) a second disc seating ring having a second seating surface and being positioned in said passage with said second seating surface in contact with said rim; and
   (e) annular disc retaining means positioned in said passage and urging said second seating ring, said disc, and said first seating ring together and against said shoulder to seal said passage.

5. An arrangement as set forth in claim 1 wherein:
   (a) said end walls of said receptacle are maintained in spaced apart relation by side wall means extending therebetween and fixedly secured thereto.

6. A replaceable rupture disc cartridge arrangement comprising:
   (a) a rupture disc cartridge receptacle having spaced apart end walls, each wall having a pressure relief aperture therethrough, said receptacle being adapted for installation with the pressure relief apertures thereof in communication with a pressure relief vent;
   (b) a rupture disc cartridge body having a central passage therethrough and having opposite ends, said cartridge body being removably positioned in said receptacle with said passage communicating with said pressure relief apertures;
(c) a rupture disc removably retained in said passage and preventing fluid flow therethrough; and
(d) sealing means operatively positioned between said ends of said cartridge body and respective facing internal surfaces of said end walls of said receptacle to prevent the leakage of pressure therebetween, said sealing means including:
  (1) a seal mounting ring received on an end of said cartridge body in surrounding relation to said passage, said seal mounting ring being resiliently urged away from said one end of said cartridge body;
  (2) a circumferential end seal mounted on an end surface of said seal mounting ring for engagement with an internal surface of said end wall facing said one end of said cartridge body; and
  (3) cartridge body seal means between said seal mounting ring and said cartridge body.

7. An arrangement as set forth in claim 6 including: seal cam means on one of said seal mounting ring and said internal surface for spacing said circumferential end seal from said internal surface during insertion of said cartridge body into said receptacle until said cartridge body is properly positioned therein and during removal of said cartridge body from said receptacle to thereby prevent damage to said circumferential end seal.

8. An arrangement as set forth in claim 7 wherein said cam means includes:
a linear cam on said internal surface, said cam being positioned to engage with and depress said seal mounting ring upon insertion of said cartridge body into said receptacle, to disengage from said seal mounting ring upon said cartridge body being positioned properly within said receptacle, and to engage with said seal mounting ring during removal of said cartridge body from said receptacle.

9. An arrangement as set forth in claim 7 wherein said cam means includes:
(a) said seal mounting ring having a circumferential cam ridge thereon, said cam ridge engaging said receptacle end wall internal surface during said insertion and removal of said cartridge body to thereby depress said seal mounting ring and space said end seal from said internal surface; and
(b) said internal surface having a circumferential positioning groove formed therein in surrounding relation to the pressure relief aperture of said end wall facing said one end of said cartridge body, said positioning groove receiving said cam ridge therein to properly position said cartridge body within said receptacle.

10. An arrangement as set forth in claim 6 including: self-sealing means responsive to pressure within said pressure relief vent associated with said arrangement to forcefully urge said seal mounting ring against said internal surface to positively seal between said cartridge body and said receptacle.

11. An arrangement as set forth in claim 10 wherein said self-sealing means includes:
(a) said cartridge body having a seal mounting ring recess, said recess terminating in an end surface;
(b) said seal mounting ring including a head surface and being received in said recess with said head surface facing said end surface of said recess;
(c) an expansion chamber defined between said head surface and said end surface of said recess; and
(d) passageway means communicating between said expansion chamber and said pressure relief vent such that, upon pressurization of said pressure relief vent, said expansion chamber is pressurized to thereby forcefully urge said seal mounting ring against said internal surface of said receptacle end wall.

12. An arrangement as set forth in claim 10 wherein said self-sealing means includes:
(a) said cartridge body including a circumferential channel at said cartridge body end, said channel terminating depthwise in an end surface;
(b) said seal mounting ring including a circumferential head surface, said seal mounting ring being received in said channel with said head surface facing said end surface of said channel;
(c) an expansion chamber defined between said head surface and said end surface of said channel; and
(d) passageway means communicating between said expansion chamber and said pressure relief vent such that, upon pressurization of said pressure relief vent, said expansion chamber is pressurized to thereby forcefully urge said seal mounting ring against said internal surface of said receptacle end wall.

13. An arrangement as set forth in claim 12 wherein:
(a) said channel is defined by said end surface, a circumferential inside surface, and circumferential outside surface;
(b) said seal mounting ring has a circumferential inside surface and a circumferential outside surface;
(c) said cartridge body seal means extends circumferentially between said seal mounting ring outside surface and said channel outside surface; and
(d) said passageway means extends circumferentially and is defined between said seal mounting ring inside surface and said channel inside surface.

14. An arrangement as set forth in claim 10 wherein said self-sealing means is provided at each of said opposite ends of said cartridge body for sealing respectively with said end walls.

15. A replaceable rupture disc cartridge arrangement comprising:
(a) a rupture disc cartridge receptacle having spaced apart end walls, each wall having a pressure relief aperture therethrough, said receptacle being adapted for installation with the pressure relief apertures thereof in communication with a pressure relief vent;
(b) a rupture disc cartridge body having a central passage therethrough and having opposite ends, said cartridge body being removably positioned in said receptacle with said passage communicating with said pressure relief apertures;
(c) a rupture disc removably retained in said passage and preventing fluid flow therethrough;
(d) sealing means operatively positioned between said ends of said cartridge body and respective facing internal surfaces of said end walls of said receptacle to prevent the leakage of pressure therebetween;
(e) said passage including an internal circumferential shoulder at one end thereof;
(f) a first disc seating ring having a first seating surface and being positioned in said passage abutting said shoulder;

(g) said rupture disc having a circumferential rim and being positioned in contact with said first seating surface;

(h) a second disc seating ring having a second seating surface and being positioned in said passage with said second seating surface in contact with said rim;

(i) annular disc retaining means positioned in said passage and urging said second seating ring, said disc, and said first seating ring together and against said shoulder to seal said passage; and (j) said annular disc retaining means including:
 (1) a disc retaining ring;
 (2) a plurality of circumferentially spaced screws extending through said disc retaining ring; and
 (3) removable shoulder forming means adjacent the end of said cartridge body opposite said one end, said shoulder forming means being engaged by said disc retaining ring upon said screws being rotated to urge said seating rings and rupture disc against said shoulder.

16. An arrangement as set forth in claim 15 wherein:
(a) said passage includes a circumferential snap ring groove formed on a surface defining said passage; and
(b) said removable shoulder forming means is a snap ring.

17. A replaceable rupture disc cartridge arrangement comprising:
(a) a rupture disc cartridge receptacle having spaced apart end walls, each wall having a pressure relief aperture therethrough and an internal surface, said receptacle being adapted for installation with the pressure relief apertures thereof in communication with a pressure relief vent;
(b) a rupture disc cartridge body having a central passage therethrough and having opposite ends, said cartridge body being removably positioned in said receptacle with said passage communicating with said pressure relief apertures;
(c) a rupture disc removably retained in said passage and preventing fluid flow therethrough;
(d) a seal mounting ring received on each end of said cartridge body in surrounding relation to said passage, said seal mounting ring being resiliently urged away from said end of said cartridge body;
(e) a circumferential end seal mounted on an end surface of each of said seal mounting rings respectively for engagement with a facing internal surface of said end wall which faces said end of said cartridge body;
(f) cartridge body seal means between said seal mounting ring and said cartridge body;
(g) seal ring cam means associated with said seal mounting ring and said facing internal surface for spacing said circumferential and seal from said internal surface during insertion of said cartridge body into said receptacle until said cartridge body is properly positioned therein and during removal of said cartridge body from said receptacle to thereby prevent damage to said circumferential end seal; and
(h) self-sealing means responsive to pressure within aid pressure relief vent to forcefully urge said seal mounting ring against said facing internal surface to positively seal between said cartridge body and said receptacle.

18. An arrangement as set forth in claim 17 wherein said seal ring cam means includes:

(a) said seal mounting ring having a circumferential cam ridge thereon, said cam ridge engaging said facing internal surface during said insertion and removal of said cartridge body to thereby depress said seal mounting ring and space said circumferential end seal from said facing internal surface; and
(b) said facing internal surface having a circumferential positioning groove formed therein in surrounding relation to the pressure relief aperture in the end wall having said facing internal surface thereon, said positioning groove receiving said cam ridge therein to properly position said cartridge body within said receptacle.

19. An arrangement as set forth in claim 17 wherein said self-sealing means includes:
(a) said cartridge body including a circumferential channel at each end thereof, said channel terminating depthwise in an end surface;
(b) said seal mounting ring including a circumferential head surface, said seal mounting ring being received in said channel with said head surface facing said end surface of said channel;
(c) an expansion chamber defined between said head surface and said end surface of said channel; and
(d) passageway means communicating between said expansion chamber and said pressure relief vent such that, upon pressurization of said pressure relief vent, said expansion chamber is pressurized to thereby forcefully urge said seal mounting ring against said facing internal surface.

20. An arrangement as set forth in claim 19 wherein:
(a) said channel is defined by said end surface, a circumferential inside surface, and a circumferential outside surface;
(b) said seal mounting ring has a circumferential inside surface and a circumferential outside surface;
(c) said cartridge body seal means extends circumferentially between said seal mounting ring outside surface and said channel outside surface; and
(d) said passageway means extends circumferentially and is defined between said seal mounting ring inside surface and said channel inside surface.

21. A replaceable rupture disc cartridge arrangement comprising:
(a) a rupture disc cartridge receptacle having spaced apart end walls, each wall having a pressure relief aperture therethrough, said receptacle being adapted for installation with the pressure relief apertures thereof in communication with a pressure relief vent;
(b) a rupture disc cartridge body having a central passage therethrough and having opposite ends, said cartridge body being removably positioned in said receptacle with said passage communicating with said pressure relief apertures;
(c) a rupture disc removably retained in said passage and preventing fluid flow therethrough;
(d) sealing means operatively positioned between said ends of said cartridge body and respective facing internal surfaces of said end walls of said receptacle to prevent the leakage of pressure therebetween;
(e) said passage including an internal circumferential shoulder at one end thereof;
(f) a first disc seating ring having a first seating surface and being positioned in said passage abutting said shoulder;

(g) said rupture disc having a circumferential rim and being positioned with said rim in contact with said first seating surface;
(h) a second disc seating ring having a second seating surface and being positioned in said passage with said second seating surface in contact with said rim;
(i) annular disc retaining means positioned in said passage and urging said second seating ring, said disc, and said first seating ring together and against said shoulder to seal said passage; and
(j) said cylindrical passage being defined by a passage cylindrical surface and including:
 (1) first seating ring seal means on surface of said first seating ring which abuts said shoulder to seal between said first seating ring and said shoulder; and
 (2) second seating ring seal means on an external cylindrical surface of said secnd seating ring to seal between said second seating ring and said passage cylindrical surface.

22. An arrangement as set forth in claim 21 wherein:
(a) said first seating ring includes a first circumferential seal groove formed on an abutment surface abutting said shoulder;
(b) said first seating ring seal means is a first O-ring positioned in said first circumferential seal groove;
(c) said second seating ring includes a second circumferential seal groove formed on said external cylindrical surface thereof; and
(d) said second seating ring seal means is a second O-ring positioned in said second circumferential seal groove.

* * * * *